C. R. POLEN, Sr.
Clod-Crusher.
No. 204,247. Patented May 28, 1878.
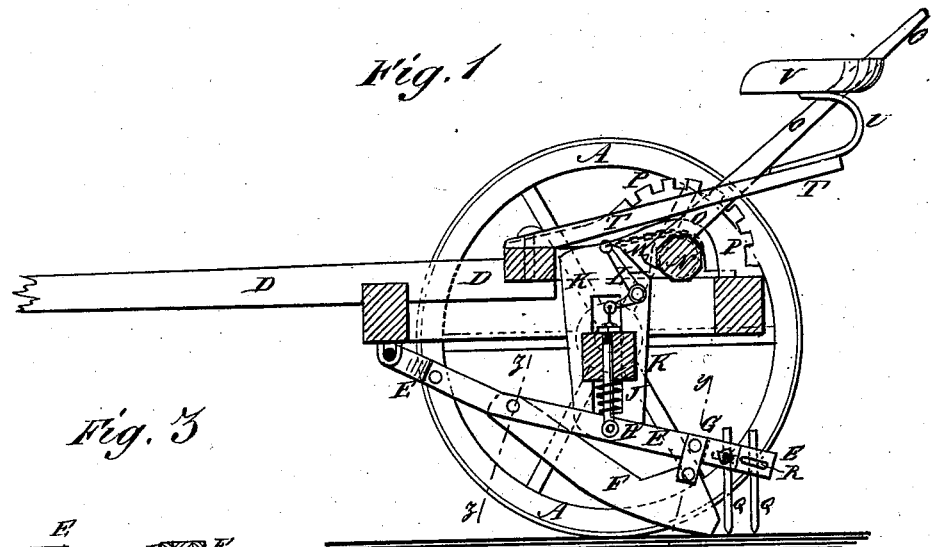
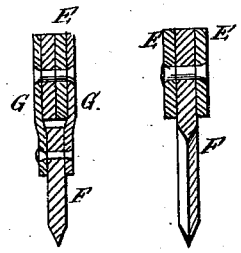
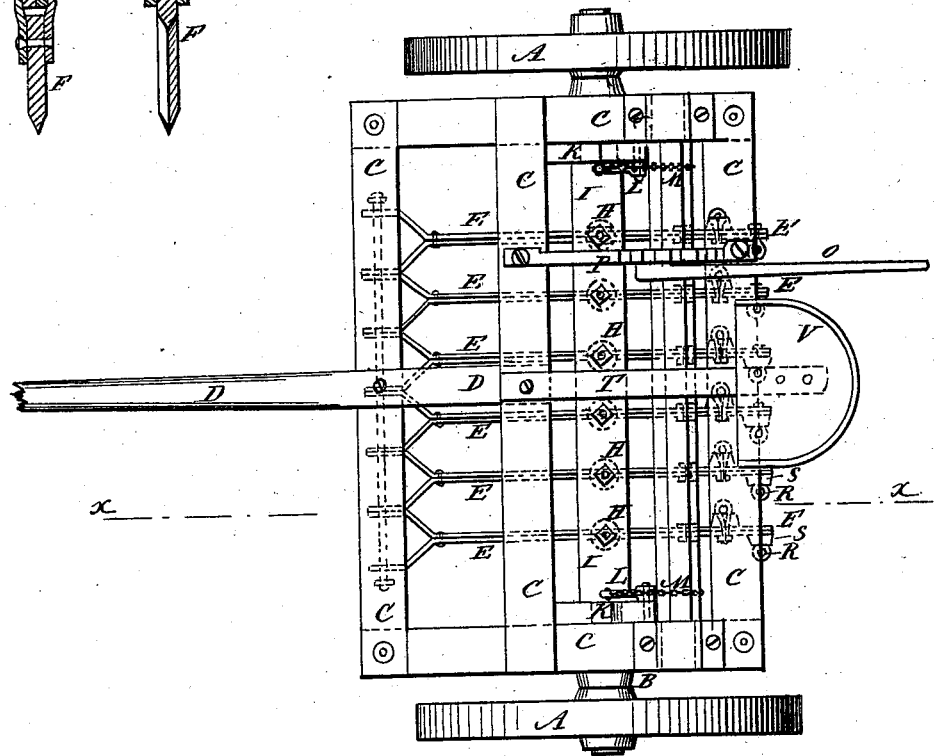
WITNESSES:
C. Neveux
C. Sedgwick
INVENTOR:
C. R. Polen Sr.
BY Munn & Co
ATTORNEYS.

UNITED STATES PATENT OFFICE.

CHARLES R. POLEN, SR., OF HAZEL DELL, ILLINOIS.

IMPROVEMENT IN CLOD-CRUSHERS.

Specification forming part of Letters Patent No. 204,247, dated May 28, 1878; application filed March 11, 1878.

*To all whom it may concern:*

Be it known that I, CHARLES ROBERT POLEN, Sr., of Hazel Dell, in the county of Cumberland and State of Illinois, have invented a new and useful Improvement in Soil-Pulverizers, of which the following is a specification:

Figure 1 is a vertical longitudinal section of my improved machine, taken through the line $x$ $x$, Fig. 2. Fig. 2 is a top view of the same. Fig. 3 represents detail sections taken through the lines $y$ $y$ and $z$ $z$, Fig. 1.

Similar letters of reference indicate corresponding parts.

The object of this invention is to furnish an improved machine for pulverizing the soil to prepare it to receive seed, and which shall be simple in construction, convenient in use, easily kept in repair, not liable to get out of order, and effective in operation, cutting in pieces clods, sods, grass, weeds, stalks, &c., leaving the soil level and smooth, and in good condition to receive seed.

The invention consists in the construction and combination of parts hereinafter described and claimed.

A are the wheels, which revolve upon the journals of short axles B, attached to the side bars of the frame C. To the centers of the forward and middle cross-bars of the frame C is attached the tongue D, to which the draft is attached. To the forward cross-bar of the frame C are hinged the forward ends of the bars E, each of which is made double, or of two parts, bolted together. The forward ends of the parts of the bars E are spread apart, and have eyes formed in them to receive the bolt or rod by which they are hinged to the said cross-bar of the frame C, to keep them in place laterally.

F are the knives, the rear ends of which are secured to the rear parts of the double bars E by short bars G, bolted to them and to the said bars E. The forward ends of the knives F incline or curve upward, and are bolted to and between the parts of the bars E toward their forward ends. To the middle parts of the double bars E are pivoted the lower ends of guide-rods H, which pass up through holes in the cross-bar I, and have nuts screwed upon their upper ends.

J are spiral springs, which are placed upon the rods H between the cross-bar I and the bars E.

By this construction, when a knife, F, encounters an obstruction that it cannot cut, it rises and slides over it, the spring J forcing it down to its place again as soon as the obstruction has been passed.

The ends of the cross-bar I, or tenons formed upon said ends, enter and work in vertical slots in downwardly-projecting arms K, attached to the side bars of the frame C. To the end parts of the cross-bar I are pivoted the ends of two elbow-levers, L, the angles of which are pivoted to the arms K or the side bars of the frame C. To the other arms of the levers L are attached the lower ends of two short chains, M, the other ends of which are attached to the shaft N. The shaft N works in bearings attached to the side bars of the frame C, and to it is attached a lever, O, so that by operating the said lever O the knives F may be adjusted to work at any desired depth in the soil, and may be raised above the ground for convenience in passing from place to place. The lever O moves along the side of an arched bar, P, the ends of which are attached to the cross-bars of the frame C, and in the upper edge of which are formed notches to receive a pawl or other catch attached to the said lever O to hold it securely in any position into which it may be adjusted. To the opposite sides of the rear parts of the double bars E are secured harrow-teeth Q by means of hook-bolts R, which pass through them and the bars E, and through blocks S interposed between them and the said bars E.

By this construction, should any of the teeth Q strike a root or other obstruction, it will swing back upon the bolt R, so as to prevent breakage, and can be readily adjusted in place again by means of a wrench.

By this construction, also, the teeth Q, being upon the opposite sides of the bars E and set out from them by the blocks S, will loosen up the soil between the knives F and level and smooth it, leaving it in good condition to receive seed.

To the middle cross-bar of the frame C is attached the lower end of the inclined standard T, having the lower arm of a U-spring, U, attached to its upper end. To the upper arm of the spring U is attached the driver's seat, V.

Having thus described my invention, I claim as new and desire to secure by Letters Patent—

1. The combination of the hinged double bars E and the knives F with the frame C, the axles B, and the wheels A, substantially as herein shown and described.

2. The combination of the hinged double bars E, the knives F, and the harrow-teeth Q with the frame C, the axles B, and the wheels A, substantially as herein shown and described.

CHARLES R. POLEN, SR.

Witnesses:
 JAMES C. KELLY,
 JAMES M. NICHOLSON.